United States Patent
Kawashima

(10) Patent No.: US 8,534,821 B2
(45) Date of Patent: *Sep. 17, 2013

(54) NON-AQUEOUS INK-JET INK AND INK-JET RECORDING METHOD

(75) Inventor: Kouki Kawashima, Tokyo (JP)

(73) Assignee: Konica Minolta IJ Technologies, Inc., Tokyo (JP)

( * ) Notice: Subject to any disclaimer, the term of this patent is extended or adjusted under 35 U.S.C. 154(b) by 344 days.

This patent is subject to a terminal disclaimer.

(21) Appl. No.: 12/740,542

(22) PCT Filed: Feb. 28, 2008

(86) PCT No.: PCT/JP2008/053499
§ 371 (c)(1),
(2), (4) Date: Apr. 29, 2010

(87) PCT Pub. No.: WO2009/060632
PCT Pub. Date: May 14, 2009

(65) Prior Publication Data
US 2010/0309272 A1  Dec. 9, 2010

(30) Foreign Application Priority Data

Nov. 6, 2007  (JP) .................. 2007-288221

(51) Int. Cl.
*B41J 2/01* (2006.01)
(52) U.S. Cl.
USPC ............................. 347/100; 347/95
(58) Field of Classification Search
USPC ............ 347/100, 95, 96, 101, 102, 21, 20, 347/9, 14; 106/31.6, 31.27, 31.13; 523/160, 523/161
See application file for complete search history.

(56) References Cited

U.S. PATENT DOCUMENTS

| | | | |
|---|---|---|---|
| 5,169,436 A | | 12/1992 | Matrick |
| 5,939,468 A | * | 8/1999 | Siddiqui ................ 523/161 |
| 7,288,144 B2 | * | 10/2007 | Uozumi et al. ............. 106/31.6 |
| 7,655,713 B2 | * | 2/2010 | Kaneko et al. ............... 524/82 |
| 2004/0266911 A1 | * | 12/2004 | Aida et al. .................. 523/160 |
| 2007/0293601 A1 | * | 12/2007 | Ushiku et al. ................ 523/160 |
| 2009/0025604 A1 | * | 1/2009 | Deroover et al. ........ 106/31.77 |
| 2011/0018929 A1 | * | 1/2011 | Kawashima .................. 347/20 |

FOREIGN PATENT DOCUMENTS

| | | |
|---|---|---|
| EP | 1-865-036 | 12/2007 |
| JP | 2000086952 | 3/2000 |
| JP | 2000-515920 | 11/2000 |
| JP | 2000515920 | 11/2000 |
| JP | 2001-098206 | 4/2001 |
| JP | 2002526631 | 8/2002 |
| JP | 2005015672 | 1/2005 |
| JP | 2005023100 | 1/2005 |
| JP | 2005036199 | 2/2005 |
| JP | 2005060716 | 3/2005 |
| JP | 2008044981 | 2/2008 |
| WO | 2004007626 | 1/2004 |
| WO | 2006-095556 | 9/2006 |

OTHER PUBLICATIONS

English translation of Japanese Office Action, Notice of Reasons for Refusal, Patent Application No. 2009-539974.
Japanese Office Action, Patent Application No. 2009-539974.
Supplemental European Search Report EP 08 72 0994.

* cited by examiner

*Primary Examiner* — Manish S Shah
(74) *Attorney, Agent, or Firm* — Lucas & Mercanti, LLP

(57) ABSTRACT

The invention provides a non-aqueous jet printing ink which has printability (abrasion resistance and resistivity to wiping with alcohol) suitable for recording media made of plastics such as polyvinyl chloride and which is excellent in safety and can be used without problematic odor, and a method of ink-jet recording with the ink. The non-aqueous jet printing ink is characterized by containing, as the essential components, a pigment, a pigment derivative having an acid group, a fixing resin, and a compound (A) consisting of one or more members selected from the group consisting of compounds represented by the general formulae (1) and (2).

5 Claims, No Drawings

NON-AQUEOUS INK-JET INK AND INK-JET RECORDING METHOD

CROSS REFERENCE TO RELATED APPLICATION

This is a U.S. National Phase Application under 35 U.S.C. 371 of International Application PCT/JP2008/053499, filed Feb. 28, 2008, which claims the priority of Japanese Application No. 2007-288221, filed Nov. 6, 2007, the entire content of both Applications are hereby incorporated by reference.

TECHNICAL FIELD

The present invention relates to a non-aqueous ink-jet ink and an ink-jet recording method.

BACKGROUND

Recently, ink-jet recording system has been applied in various fields of printing works such as photograph imaging, various types of printings, markings and a specific printing such as a color filter because it enable to form an image easily and with low cost.

Ink-jet ink used for the ink-jet recording includes various types of ink such as an aqueous ink containing water as a principal solvent, an oil-based ink principally containing a non-volatile solvent at room temperature and substantially containing no water, a non-aqueous ink principally containing a solvent volatile at room temperature and substantially containing no water, a hot-melt ink which is solid at room temperature and thermally melted for printing and an active light curable ink capable of curing by active rays such as light, which are selected in accordance with the use.

Besides, a recording medium made from plastics such as polyvinyl chloride and polyethylene is used for outdoor notice board which is required to have a weather resistance for a long period and ability of contacting with a curved surface is used, particularly a medium made from soft polyvinyl chloride is used in wide field of use. The ink-jet recording method is applied as a method suitable for making small amount and diverse kinds of printing matters since plate making is not necessary and the time for finishing is short in such system, though many methods are applied for printing an image on the polyvinyl chloride.

Hitherto, the non-aqueous ink containing cyclohexanone as the principal solvent is used on the occasion of printing on the soil polyvinyl chloride recording medium, for example, an ink-jet ink containing cyclohexanone is disclosed (cf. Patent Document 1). Cyclohexanone has high dissolving ability for soft polyvinyl chloride so that the pigment contained in the ink is come into soft polyvinyl chloride. Therefore, high abrasion resistance and high glossiness of the printed matter can be obtained. However, cyclohexanone is regulated as the First Class Organic Solvent and causes a problem of safety and a local exhaust system is necessary on the occasion of handling the ink-jet ink containing cyclohexanone. Further, organic solvents such as cyclohexanone has potent odor and has issues of long-lasting odor of a printed matter as well as being burden to workers.

In contrast to that, non-aqueous ink containing no cyclohexanone is developed and marketed. For example, non-aqueous inks containing a water soluble organic solvent such as N-methylpyrrolidone and lactone as the solvent capable of dissolving polyvinyl chloride in place of cyclohexanone causing the above problems are disclosed (cf. Patent Documents 2 and 3). Moreover, a non-aqueous ink containing a fixing resin such as a vinyl chloride-vinyl acetate copolymer and an acryl resin for improving the fastness of the image such as abrasion resistance is disclosed (cf. Patent Documents 4 and 5). An ink-jet ink which is inhibited some degree in the odor thereof and has the abrasion resistivity of image formed thereby on polyvinyl chloride medium can be obtained by such constitution.

However in view that a work environment for an user of ink-jet printer is mainly indoor and a printed matter is displayed in harsh environment such as outdoor for a long period, any non-aqueous ink-jet ink is not obtained yet, which has no problem of the safeness and odor and sufficient abrasion resistivity.

Patent Document 1: Japanese translation of PCT international application 2002-526631
Patent Document 2: Unexamined Japanese Patent Application (hereinafter, refers to as JP-A) No. 2005-15672
Patent Document 3: JP-A 2005-60716
Patent Document 4: JP-A 2005-36199
Patent Document 5: WO 2004/007626

DETAILED EXPLANATION OF THE INVENTION

Problems to be Solved by the Present Invention

The present invention is attained on the above background. An object of the invention is to provide a non-aqueous ink-jet ink which has printing suitability (abrasion resistance and resistivity to wiping with alcohol) for a plastic recording medium such as polyvinyl chloride recording medium and is superior in safeness without problem of odor and an ink-jet recording method using the same ink-jet ink.

Means to Solve the Problems

The above object of the invention can be attained by the following constitution.

1. A non-aqueous ink-jet ink comprising a pigment, a pigment derivative having an acid group, a resin for fixing an image and a compound (A) at least one selected from the group of compound represented by Formulae (1) and (2), wherein

Formula (1)

wherein $R^1$ and $R^2$ each independently represent a group having 1-6 carbon atoms, and $R^1$ and $R^2$ may be jointed to form a ring, and

Formula (2)

wherein $R^3$ and $R^4$ each independently represent a group having 1-6 carbon atoms, and $R^3$ and $R^4$ may be jointed to form a ring.

2. The non-aqueous ink-jet ink of item 1, wherein a content of Compound (A) is 1.5% to 30% by mass.
3. The non-aqueous ink-jet ink of item 1 or 2 comprising a Solvent (B) at least one selected from the group of compound represented by Formulae (3) and (4):

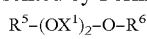

Formula (3)

wherein $R^5$ and $R^6$ each independently represent a methyl group or an ethyl group; and $OX^2$ represents an oxyethylene group or an oxypropylene group, and

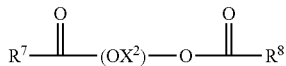

Formula (4)

wherein $R^7$ and $R^8$ each independently represent a methyl group or an ethyl group; and $OX^2$ represents an oxyethylene group or an oxypropylene group.

4. The non-aqueous ink-jet ink of item 3, wherein a content of Solvent (B) is 50% to 90% by mass.

5. The non-aqueous ink-jet ink of item 3 or 4, wherein Solvent (B) is at least one selected from the group of diethyleneglycol diethyl ether, dipropyleneglycol dimethyl ether, dipropyleneglycol diethyl ether, ethyleneglycol diacetate and propyleneglycol diacetate.

6. The non-aqueous ink-jet ink of any one of items 1 to 5, wherein the resin for fixing an image is produced by a solution polymerization method.

7. The non-aqueous ink-jet ink of any one of items 1 to 6, wherein the resin for fixing an image has a number average molecular weight of from 10,000 to 30,000; and the resin is one selected from the group of a vinyl chloride-vinyl acetate copolymer, a vinyl chloride-vinyl acetate-maleic anhydride copolymer, a vinyl chloride-vinyl acetate-vinyl alcohol copolymer and a vinyl chloride-vinyl acetate-hydroxyalkyl acrylate copolymer.

8. An inkjet recording method of forming an image on a recording medium by using the non-aqueous ink-jet ink of any one of items 1 to 7, wherein the recording medium comprising one selected from the group of a polyvinyl chloride or a resin substrate without a plasticizer and an non-absorbable inorganic substrate as a constituting element.

Effects of the Invention

The present invention made it possible to provide a non-aqueous ink-jet ink and an inkjet recording method thereby which exhibit printing suitability (abrasion resistance, resistivity to wiping with alcohol) on a plastic recording medium such as polyvinyl chloride, excellent safety and no odor.

DESCRIPTION OF THE PREFERRED EMBODIMENT

The best embodiment for embodying the invention is described in detail below.

As a result of various investigations by the inventors on the non-aqueous ink-jet ink, it is found that a non-aqueous ink-jet ink which exhibit printing suitability (abrasion resistance, resistivity to wiping with alcohol) on a plastic recording medium such as polyvinyl chloride, excellent safety and no odor is realized by a non-aqueous ink-jet ink comprising a pigment, a pigment derivative having an acid group, a resin for fixing an image and a compound (A) at least one selected from the group of compound represented by Formulae (1) and (2).

The constitution of a non-aqueous ink-jet ink of the present invention will now be detailed.

A non-aqueous ink-jet ink of the present invention (hereinafter refer to as an ink-jet ink or an ink) is characterized by comprising a pigment, a pigment derivative having an acidic group, a resin for fixing an image and a compound (A) selected from the group of sulfoxide or sulfone compound represented by Formulae (1) and (2).

Although the precise mechanism is as yet not well known, it is presumed that when a pigment derivative having acid group is co-existed with a compound represented by Formula (1) or (2), pigment is uniformly dispersed into fine particles, and friction on an image surface formed by printing on a recording medium decreases, resulting in improving an abrasion resistance or a resistivity to wiping with alcohol which are objects of the present invention.

[Pigment Derivative Having an Acidic Group]

The non-aqueous ink-jet ink according to the present invention is characterized by containing a pigment derivative having an acid group.

A pigment derivative having an acid group relating to the present invention refers to a compound in which an acidic functional group is bonded to a mother nucleus having a pigment structure directly or via linking group. Specific example of an acidic functional group include, for example, a sulfonic acid group, a carboxylic acid group, a phosphate group, a boric-acid group and a hydroxyl group, preferably a sulfonic acid group and a carboxylic acid group, more preferably a sulfonic acid group.

As a method for preparing pigment having an acidic functional group on the surface, for example, disclosed is a method in which a surface of a pigment is treated with appropriate oxidant result in introducing an acid group such as a sulfonic acid or a salt thereof at least a part on a surface of a pigment in WO No. 97/48769, JP-A No. 10-110129, JP-A No. 11-246807, JP-A No. 11-57458, JP-A No. 11-18739, JP-A No. 11-323232, and JP-A No. 2000-265094. Specific example includes a method for preparing by oxidation of carbon black by concentrated nitric acid and in the case of color pigment, a method for preparing by oxidation by sulfamic acid, sulfonated pyridine salt or amidesulfonic acid in sulfolane or N-methyl-2 pyrrolidone. In these reactions, pigment dispersion can be obtained by eliminating and purifying a compound which become soluble in water due to excess oxidation. Further, in the case of introducing sulfonic acid group by oxidation, an acid group may be neutralized by a basic compound as appropriate.

As other method, cited is a method in which a pigment derivative disclosed in JP-A 11-49974, JP-A 2000-273383, JP-A 2000-303014 each is absorbed on the surface of pigment particles by a treatment such as milling, or a method in which a pigment disclosed in JP-A 2002-179977, JP-A 2002-20141 each is solved into a solvent as well as a pigment derivative and followed by a crystallization into a poor solvent. By any method, pigment particles having acidic functional group on the surface can be easily obtained.

According to the present invention, an acidic functional group may be in a state of free or a salt, or having a counter ion. Specific example of a counter salt includes an inorganic salt such as lithium, sodium, potassium, magnesium, calcium, aluminum, nickel, or ammonium and an organic salt such as triethyl ammonium, diethyl ammonium, pyridinium, triethanol ammonium, and preferably a counter salt having monovalent valence.

Further, a compound represented by Formula (5) may be usable as more preferable pigment derivative having an acid group.

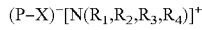

Formula (5)

In Formula (5), P represents a kind of an organic coloring matter selected from a group of azos, benzimidazolones, phthalocyanines, quinacridones, anthraquinones, dioxanes, diketopyrrolopyrroles, quinophthalones, isoindolenones, isoindolins, perylenes, perynones, flavanthrones, pyranthrone, or anthrapyrimidines; X represents sulfonic acid group or carboxylic acid group; $R_1$ represents an alkyl group having 5-20 carbon atoms; $R_2$, $R_3$, $R_4$ each independently represents a hydrogen atom or an alkyl group having 1-20 carbon atoms.

A content of a pigment derivative having an acid group related to the present invention is preferable 2-15% by mass based on a total of a pigment and a pigment derivative, more preferably 1-10% by mass. When a content of a pigment derivative having an acid group is within above range, an anti-abrasion property which is an object and effect of the present invention can be achieved.

A pigment included in the present invention and a pigment structure part of a mother nucleus in a pigment derivative is not necessary to have the same structure. However, in view of a final color of a prepared ink, a pigment derivative having near color phase with a dispersed pigment such as a yellowish pigment derivative in the case of yellow pigment, a reddish pigment derivative in the case of a red pigment, a bluish pigment derivative in the case of blue pigment, or a colorless pigment derivative is preferable due to have a pigment dispersion having excellent color phase.

[Compounds Represented by Formula (1) and (2)]

Compounds represented by Formula (1) and (2) relating to the present invention will now be further detailed.

In Formula (1), $R^1$ and $R^2$ are each a substituent having 1 to 6 carbon atoms, for example, a straight or branched chain alkyl group such as a methyl group, an ethyl group, an n-propyl group and an isopropyl group; an alkyl group substituted by a hetero atom such as a hydroxyethyl group, an acetyl group and an acetonyl group; a cyclic group such as a cyclohexyl group and a phenyl group, and an aromatic substituent, and $R^1$ and $R^2$ may be the same or different and may be linked for forming a ring.

In Formula (2), $R^3$ and $R^4$ are each a substituent having 1 to 6 carbon atoms, for example, a straight or branched chain alkyl group such as a methyl group, an ethyl group, an n-propyl group and an isopropyl group; an alkyl group substituted by a hetero atom such as a hydroxyethyl group, an acetyl group and an acetonyl group; a cyclic group such as a cyclohexyl group and a phenyl group, and an aromatic substituent, and $R^3$ and $R^4$ may be the same or different and may be linked for forming a ring.

Examples of the compound represented by Formula (1) or (2) include dimethyl sulfoxide, diethyl sulfoxide, methyl ethyl sulfoxide, diphenyl sulfoxide, tetraethylene sulfoxide, dimethylsulfone, methyl ethyl sulfone, methyl isopropyl sulfone, methyl hydroxyethyl sulfone and sulfolane.

The content of Compound (A) in the ink-jet ink is preferably from 1.5% to 30%, more preferably from 3% to 20%, and still more preferably from 5% to 15% by mass. When the content of Compound (A) is equal to or more than 1.5% by mass, abrasion resistance and resistivity to wiping with alcohol can be obtained to an image formed on polyvinyl chloride because that an ink has sufficient solubility to polyvinyl chloride. Further when the content of Compound (A) is 3% or more by mass, good abrasion resistance and resistivity to wiping with alcohol can be achieved. When the content is 30% or less by mass, operational abnormality of the ink-jet head after long term use can be prevented and an ejection stability can be achieved.

[Compounds Represented by Formula (3) and (4)]

The ink-jet ink of the invention may contain a non-aqueous solvent and preferably contain Solvent (B) constituted by at least one compound selected from the group consisting of compounds the foregoing Formulae (3) and (4).

In Formula (3), $R^5$ and $R^6$ each represent a methyl group or an ethyl group and $OX^1$ represents an oxyethylene group or an oxypropylene group.

In Formula (4), $R^7$ and $R^8$ each independently represent a methyl group or an ethyl group; and $OX^2$ represents an oxyethylene group or an oxypropylene group.

Examples of the compounds represented by Formula (3) and (4) of the invention include diethylene glycol dimethyl ether, diethylene glycol diethyl ether, dipropylene glycol dimethyl ether, dipropylene glycol diethyl ether, ethyleneglycol diacetate and propyleneglycol diacetate.

Among them, at least one selected from the group of diethylene glycol diethyl ether, dipropylene glycol dimethyl ether, dipropylene glycol diethyl ether, ethyleneglycol diacetate and propyleneglycol diacetate is preferable as the component of Solvent (B), by which the fast drying ability of the image printed on polyvinyl chloride can be further improved. Among them, preferable Solvent (B) contains diethyleneglycol diethylether: ethyleneglycol diacetate at least in ratio of 1:1 to 10:1.

The content of Solvent (B) in the ink-jet ink is preferably from 50% to 90% by mass. The fast drying ability of image printed on polyvinyl chloride and the ejection stability is improved and the odor of the ink can be reduced by such solvent constitution.

[Other Solvent]

The ink-jet ink of the invention may contain a known organic solvent other than Compound (A) and Solvent (B) within the range in which the object of the invention is not vitiated. Examples of such solvent include alkyleneglycol monoalkylethers such as diethyleneglycol monoethyl ether, triethyleneglycol monomethyl ether, dipropyleneglycol monomethyl ether and tripropyleneglycol monomethyl ether; alkyleneglycol dialkyl ethers such as ethyleneglycol dibutyl ether and tetraethyleneglycol dimethyl ether; and alkyleneglycol monoalkylether acetate such as ethyleneglycol monobutylether acetate.

[Fixing Resin]

A fixing resin relating to the present invention will now be further detailed.

Various fixing resins (resins for fixing), hereinafter simply referred to as resin, are added to the ink-jet ink of the invention for improving fixing ability when the ink is printed on the recording medium of plastics such as polyvinyl chloride.

As the fixing resin, an acryl type resin, a polyester type resin, a polyurethane type resin, a vinyl chloride type resin and a vinyl chloride-vinyl acetate copolymer may be used.

Concrete examples of the resin include an acryl type resin such as Johncryl manufactured by Johnson Polymer Co., Ltd., and ESLEC P manufactured by Sekisui Co., Ltd.; a polyester type resin such as ELITEL manufactured by Unitica Co., Ltd., and Vylon, manufactured by Toyobo Co., Ltd.; a polyurethane type resin such as Vylon UR manufactured by Toyobo Co., Ltd., NT-HiLamic, manufactured by Dainichi Seika Co., Ltd., Crysvon manufactured by Dainihon Ink Kagaku Kogyo Co., Ltd., and Nipporan manufactured by Nihon Polyurethane Co., Ltd.; and a vinyl chloride type resin such as SOLBIN manufactured by Nisshin Kagaku Kogyo Co., Ltd., Vinibran manufactured by Nisshin kagaku Kogyo Co., Ltd., Salantex manufactured by Asahi Kasei Chemicals Co., Ltd., Sumielite manufactured by Sumitomo Kagaku Co., Ltd., Sekisui PVC manufactured by Sekisui Kagaku Kogyo Co., Ltd., and UCAR manufactured by Dow Chemical Co., Ltd.

The fixing resin functions as a binder for contacting the colorant such as a pigment with the recording medium after printing, and the adhesiveness and the durability are raised accompanied with the increasing in the molecular weight of the fixing resin. Lower molecular weight causes lowering in the viscosity of the ink and energy necessary for ejecting the ink on the occasion of printing is decreased accompanied with lowering of the viscosity so that the load to the ink jet head is reduced and the ejection tends to be stable. Consequently the fixing after printing is sufficiently performed when the number average molecular weight is not less than 10,000 and the loading for ejecting the ink becomes excessively high when the molecular weight is not more than 30,000. Therefore, the molecular weight within the above range is preferred.

Particularly preferred rein is one having a number average molecular weight of from 10,000 to 30,000 and is comprised of at least one resin selected from a vinyl chloride-vinyl acetate copolymer, a vinyl chloride-vinyl acetate-maleic anhydride copolymer, a vinyl chloride-vinyl acetate-vinyl alcohol copolymer and vinyl chloride-vinyl acetate-hydroxyalkyl acrylate copolymer. The vinyl chloride-vinyl acetate copolymer and a vinyl chloride-vinyl acetate-maleic anhydride copolymer may be mixed for use, and the vinyl chloride-vinyl acetate copolymer or the vinyl chloride-vinyl acetate-maleic anhydride copolymer may be mixed with an acryl type resin, a polyester type resin or a polyurethane type resin.

The ejection stability, abrasion resistance and resistivity against alcohol wiping can be improved in suitable balance by adding the fixing resin to the ink of the invention.

The resistivity to wiping with alcohol of the present invention is a resistivity against deformation of the image such as peeling caused by wiping the image surface with ethanol or an ethanol-water mixture. Such wiping is necessary for removing dirt adhered on the image such as an outdoor poster.

For synthesis of the fixing resin relating to the invention, a usual polymerization method such as a suspension polymerization method, an emulsion polymerization method and a solution polymerization method can be applied without any limitation. Among them, the solution polymerization method is preferred.

The solution polymerization method is a method for radical polymerizing monomer having a vinyl group in which the monomer and a polymerization initiator are dissolved in a solvent capable of dissolving the polymer to be formed and polymerized by heating.

The fixing resin synthesized by the solution polymerization method is highly dissolvable even when the molecular weight is relatively high and relatively large amount of the resin can be contained in the ink. Therefore, the abrasion resistance can be improved.

The content of the fixing resin in the ink of the invention is preferably from 1 to 10% by mass. The content of not less than 1% by mass improves the weather resistance of image printed on polyvinyl chloride and that of not more than 10% by mass stabilizes the ink ejection ability. More preferable content range is from 3 to 7% by mass.

[Pigment]

The pigment relating to the present invention is described below.

The weather resistance of the image recorded on the recording medium made from plastics such as polyvinyl chloride can be improved by using a pigment as the colorant of the non-aqueous ink-jet ink of the invention.

Any known pigments can be used as the pigment to be used in the invention without any limitation, for example, insoluble pigments, organic pigments such as lake pigments and inorganic pigments such as carbon black are preferably used.

As the insoluble pigment, for example, an azo, an azomethine, a methine, a diphenylmethane, a triphenylmethane, a quinacridone, an anthraquinone, a perylene, an indigo, a quinophthalone, an isoindolinone, an isoindoline, an azine, an oxazine, a thiazine, a dioxazine, a thiazole, a phtlocyanine and diketopyrolopyrrole type pigments are preferred.

As the pigment preferably to be used, for example, the following pigments can be cited.

Examples of a magenta and red pigment include C.I. Pigment Red 2, C.I. Pigment Red 3, C.I. Pigment Red 5, C.I. Pigment Red 6, C.I. Pigment Red 7, C.I. Pigment Red 12, C.I. Pigment Red 15, C.I. Pigment Red 16, C.I. Pigment Red 48 (Ca), C.I. Pigment Red 48 (Mn), C.I. Pigment Red 48:1, C.I. Pigment Red 53:1, C.I. Pigment Red 57 (Ca), C.I. Pigment Red 57:1, C.I. Pigment Red 112, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 168, C.I. Pigment Red 177, C.I. Pigment Red 178, C.I. Pigment Red 184, C.I. Pigment Red 202, C.I. Pigment Red 209, C.I. Pigment Red 222, C.I. Pigment Red 254 and C.I. Pigment Violet 19.

Examples of an orange or yellow pigment include C.I. Pigment Orange 32, C.I. Pigment Orange 43, C.I. Pigment Yellow 1, C.I. Pigment Yellow 2, C.I. Pigment Yellow 3, CI. Pigment Yellow 12, C.I. Pigment Yellow 13, C.I. Pigment Yellow 14, C.I. Pigment Yellow 15, C.I. Pigment Yellow 15:3, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 120, C.I. Pigment Yellow 128, C.I. Pigment Yellow 129, C.I. Pigment Yellow 130, C.I. Pigment Yellow 138, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, C.I. Pigment Yellow 213 and C.I. Pigment Yellow 214.

Examples of a green or cyan pigment include C.I. Pigment Blue 1, C.I. Pigment Blue 2, C.I. Pigment Blue 3, C.I. Pigment Blue 15, C.I. Pigment Blue 15:2, C.I. Pigment Blue 15:3, C.I. Pigment Blue 15;4, C.I. Pigment Blue 16, C.I. Pigment Blue 22, C.I. Pigment Blue 60 and C.I. Pigment Green 7.

When red, green, blue or intermediate color is required other than the above, the following pigments are preferably used singly or in combination, for example, C.I. Pigment Reds 209, 224, 177 and 194;
C.I. Pigment Orange 43;
C.I. Vat Violet 3;
C.I. Pigment Violets 19, 23 and 37;
C.I. Pigment Green 36 and 7, and
C.I. Pigment Blue 15:6.

As a black pigment, for example, C.I. Pigment Black 1, C.I. Pigment Black 6 and C.I. Pigment Black 7 can be cited.

The content of these pigments in the ink of the invention is preferably from 2 to 10% by mass. A light colored ink is sometimes used for reducing the granularity of image. In such case, the content of the pigment is preferably reduced by ⅕ to ½.

The pigments relating to the invention are preferably used after dispersed by a dispersing machine together with a surfactant and an additive necessary for satisfying a designated purpose. As the dispersing machine, known dispersing machines such as a ball mill, a sand mill, an attritor, a roller mill, an agitator, a Henschel mixer, a colloid mill, an ultrasonic homogenizer, a pearl mill, a wet jet mill and a paint shaker are applicable.

The average particle diameter of the pigment dispersion to be used in the ink of the invention is preferably from 10 nm to 200 nm, and more preferably from 50 nm to 150 nm. The aggregation of the particles can be inhibited by making the average particle diameter to not less than 10 nm and the sedimentation of the pigment during storage for a prolonged period can be easily controlled by making the average particle diameter to not more than 200 nm. Therefore, the ink having good storage stability easily can be obtained by making the average particle diameter within the above range.

The particle diameter of the pigment dispersion can be measured by a particle diameter measuring apparatus available on the market utilizing a light scattering method, an electrophoretic method or a laser Doppler method. The average particle diameter also can be measured by using electron microscope. In such case, 100 or more particles are photographed and the resultant images are subjected to statistic treatment by using an image analyzing software such as Image-Pro, manufactured by Mediacybemetics Co., Ltd.

As the pigment dispersing agent, a surfactant and a polymer dispersant are usable and the polymer dispersant is preferred. Examples of the polymer dispersant include a (meth)acryl type resin, a styrene-(meth)acryl type resin, a hydroxyl group-containing carboxylic acid ester, a salt of a long chain polyaminoamide and a high molecular weight acid ester, a salt of high molecular weight polycarboxylic acid, a salt of a long chain polyaminoamide and a polar acid ester, a high molecular weight unsaturated acid ester, a modified polyurethane, a modified polyacrylate, a poly ether ester type anionic surfactant, a naphthalene sulfonic acid formalin condensate salt, an aromatic sulfonate formalin condensate salt, a polyoxyethylene alkylphosphate, polyoxyethylene nonylphenyl ether, stearylamine acetate and a pigment derivative.

Concretely, Johncryl manufactured by Johnson Polymer Co., Ltd., Anti-Terra-U manufactured by BYK Chemie Co., Ltd., Disperbyk manufactured by BYK Chemie Co., Ltd., Efka manufactured by Efka Chemicals Co., Ltd., Flowlen manufactured by Kyoei Kagaku Co., Ltd., Disparon manufactured by Kusumoto Kasei Co., Ltd., Ajisper manufactured by Ajinomoto Finetechno Co., Ltd., Demol, Homogenol and Emulgen each manufactured by Kao Co., Ltd., Solsperse manufactured by Avecia Co., Ltd., and Nikkol manufactured by Nikko Chemical Co., Ltd., are cited.

The dispersant content of the ink-jet ink of the invention is preferably from 10 to 200% by mass based on a pigment. The stability of the pigment dispersion is raised in the range of not less than 10% by mass and the ejection of the ink from the ink-jet head can be easily stabilized by making the content to not more than 200% by mass.

[Other Additives]

In the ink-jet ink of the invention, various kinds of known additive such as a viscosity controlling agent, a relative resistivity controlling agent, a film forming agent, a UV absorbent, an antioxidant, an anti-color fading agent, an anti-mold agent, a rust preventive and a stabilizing agent for vinyl chloride such as an anti-dehydrochlorination reaction agent may be added additional to the foregoing materials corresponding to the purposes of improving various properties of the ink such as the ejection stability, suitability for the print head or the ink cartridge, storage stability, an image storage stability and other performances.

[Ink-Jet Recording Method]

The ink-jet head to be used on the occasion of image formation by ejecting the ink-jet ink of the invention may be either an on-demand type or a continuous type. The ejection system may be any of an electro-mechanical conversion system such as a single cavity type, a double cavity type, a bender type, a piston type, a share mode type and a shared wall type, and an electro-thermal conversion system such as a thermal ink-jet type and Bubble Jet® type.

In the ink-jet recording method using the ink-jet ink of the invention, an ink-jet recorded image can be obtained by ejecting the ink from the ink-jet head according to digital signals and adhering onto the recording medium using, for example, a printer in which the ink is charged. The image formation while raising the surface temperature of the image recording medium is preferable for fast and surely drying the ink adhering on the recording medium.

The surface temperature is preferably from 40 to 100° C. though the temperature is controlled corresponding to the durability of the recording medium or the drying ability of the ink. Particularly, it is more preferable that the recording is carried out while raising the surface temperature because the wetting ability of the ink with the recording medium surface is improved when polyvinyl chloride is used as the recording medium.

The wetting ability and the drying ability of the ink are varied sometimes depending on the kind of the polyvinyl chloride. Therefore, the surface temperature may be controlled according to the properties of the recording medium.

When the recording is carried out while the surface temperature of the recording medium is raised, a heater is preferably installed in the ink-jet recording apparatus. The surface temperature of the recording medium can be controlled by only the ink-jet recording apparatus by beating the recording medium before or during transportation of the recording medium by the installed heater.

[Recording Medium]

According to the present invention, it is characterized by using the recording medium comprising one selected from the group consisting of a polyvinyl chloride or a resin substrate without a plasticizer and a non-absorbable inorganic substrate as a constituent of recording medium for forming an image thereon by using the non-aqueous ink-jet ink of the present invention.

The recording medium to be used in the ink-jet recording method of the invention is preferably one made from polyvinyl chloride. Concrete examples of the recording medium composed of polyvinyl chloride include SOL-371G, SOL-373M and SOL-4701 each manufactured by Bigtechnos Co., Ltd., Glossy Vinyl Chloride manufactured by Systemgraphy Co., Ltd., KSM-VS, KSM-VST and KSM-VT each manufactured by Kimoto Co., Ltd., J-CAL-HGX, J-CAL-YHG and J-CAL-WWWG each manufactured by Kyosho Osaka Co., Ltd., BUS MARK V400° F. vinyl and LITECcal V-600 vinyl each manufactured by Flexcon Co., Ltd., FR2 manufactured by Hanwah Co., Ltd., LLBAU13713 and LLSP20133 each manufactured by Sakurai Co., Ltd., P-370B and P-400M each manufactured by Kanbo Pras Co., Ltd., S02P, S13P, S14P, S22P, S24P, S34P and S27P each manufactured by Grafityp Co., Ltd., P-223RW, P-224RW and P-284ZC each manufactured by Lintec Co., Ltd., LKG-19, LPA-70, LPE-248, LPM-45, LTG-11 and LTG-21 each manufactured by Shinseisha Co., Ltd., MP13023 manufactured by Toyo Corporation Co., Ltd., Napoleon Gloss glossy vinyl chloride manufactured by Niki Electronics Co., Ltd., JV-610 and Y-114 each manufactured by IKC Co., Ltd., NIJ-CAPVC and NIJ-SPVCGT each manufactured by Nichie Co., Ltd., 3101/H12/P4, 3104/H12/P4, 3104/H12/P4S, 9800/H12/P4, 3100/H12/R2, 3101/H12/R2, 3104/H12/R2, 1445/H14/P3 and 1438/One Way Vision each manufactured by Inetrocoat Co., Ltd., JT5129PM, JT5128P, JT5822P, JT5829P, JT5829R, JT5829PM, JT5829RM and JT5929PM each manufactured by Mactac Co., Ltd., MPI11005, MPH 900, MPI2000, MPI2001, MPI2002, MPI3000, MPI3021, MPI3500 and MPI3501 each manufactured by Avery Co., Ltd., MA-101G and MA-501G each manufactured by Gin'ich Co., Ltd., FR2 manufactured by Hanfa Japan Co., Ltd., AY-15P, AY-60P, AY-80P, DBSP137GGH and DBSP137GGL each manufactured by Insite Co., Ltd., SJT-V200F and SJT-V400E-1 each manufactured by Hiraoka Shokusen Co., Ltd., SPS-98, SPSM-98, SPSH-98, SVGL-137, SVGS-137, MD3-200, MD3-301M, MD5-100, MD5-101M and MD %-105 each manufactured by Metamark Co., Ltd., 640M, 641G, 641M, 3105M, 3105SG, 3162G, 3164G, 3164M, 3164XG, 3164XM, 3165G, 3165SG, 3165M, 3451SG, 3551G, 3551M, 3631, 3141M, 3651G, 3651M, 3651SG, 3951G and 3641M each manufactured by Orafol Co., Ltd., SVTL-HQ130 manufactured by Lami Corporation Co., Ltd., SP300 GWF and SPE-CLEAD vinyl each manufactured by Catalina Co., Ltd., RM-SJR manufactured by Ryoyo Shoji Co., Ltd., Hi Lucky and New Lucky PVC manufactured by LG Co., Ltd., SIY-110, SIY-310 and S1Y-320 each manufactured by Sekisui Co., Ltd., PRINT MI Frontlit and PRINT XL Light weight banner each manufactured by Endutex Co., Ltd., RILET 100, RIJET 145 and RIJET 165 each manufactured by Ritrama Co., Ltd., NM-SG and NM-SM each manufactured by Nichiei Kako Co., Ltd., LTO3SG manufactured by Lukio Co., Ltd., Easy Print 80 and Performance Print 80 each manufactured by Jetgraph Co., Ltd., DSE 550, DSB550, DSE 800G, DSE 802/137, V250WG, V300WG and V350WG each manufactured by Hexis Co., Ltd., and Digital White 6005PE and 6010PE each manufactured by Multifix Co., Ltd.

As a recording medium having a constituent element of a resin substrate without containing a plasticizer or a non-absorbable inorganic substrate, a various substrate below is usable as a constituent element in alone or in combination with a plural kind of substrate. Specific example of a resin substrate without containing a plasticizer include: ABS resin, polycarbonate resin (PC), polyacetal resin (POM), polyimide resin (PA), polyethylene terephthalate resin (PET), polyimide resin (PI), acryl resin, polyethylene resin (PE), polypropylene resin (PP), and hard polyvinyl chloride resin (PVC) without containing a plasticizer.

These resin features resin without containing a plasticizer and other characteristic such as thickness, shape, color, softening temperature, or hardness is not particularly limited.

Preferred recording medium used to the present invention is ABS resin, PET resin, PC resin, POM resin, PA resin, PI resin, hard PVC resin without containing a plasticizer, acryl resin, PE resin and PP resin, more preferably ABS resin, PET resin, PC resin, PA resin, hard PVC resin without containing a plasticizer, and acryl resin.

Specific example of a non-absorbable inorganic substrate include: a glass plate, a metal plate such as iron or aluminum, and a ceramic plate. These inorganic substrate features surface without having an ink absorbable layer and other characteristic such as thickness, shape, color, softening temperature, or hardness is not particularly limited.

EXAMPLES

The invention is concretely described referring examples below though the invention is not limited to them. In the invention, "part" and "%" are each "part by mass" and "% by mass", respectively, as long as any specific comment is not attached.

A pigment derivative and a fixing resin described below is used after distilling away a solvent having a low boiling point by a distillation under reduced pressure followed by diluting to an content of 20% by mass by using an organic solvent which is used to dispersion. Hereinafter, a content of a pigment derivative and a fixing resin represent a corresponding value of a solid content.

Example 1

Preparation of Pigment Derivative

According to a method described in JP-A 2000-265094, a surface of a mother nucleus pigment particles described in Table 1 are treated by an oxidant to prepare Pigment derivatives 1-8 having an acid group.

TABLE 1

| Pigment derivative No. | Constitution | |
|---|---|---|
| | Mother nucleus pigment | Acid group |
| 1 | PB15:3 | —$SO_3H$ |
| 2 | PB15:3 | —$SO_3K$ |
| 3 | PB15:3 | —$SO_3Na$ |
| 4 | PB15:3 | —$SO_3NH_4$ |
| 5 | PB15:3 | —$SO_3N(CH_3)(CH_3)(C_{18}H_{37})(C_{18}H_{37})$ |
| 6 | PB15:3 | —$SO_3N(CH_3)(CH_3)(C_{13}H_{27})(C_{18}H_{37})$ |
| 7 | PY150 | —$SO_3H$ |
| 8 | PR122 | —$SO_3H$ |
| 9 | PY150 | —$SO_3N(CH_3)(CH_3)(C_{18}H_{37})(C_{18}H_{37})$ |
| 10 | PR122 | —$SO_3N(CH_3)(CH_3)(C_{18}H_{37})(C_{18}H_{37})$ |

PB15:3 C.I. Pigment Blue 15:3
PY150 C.I. Pigment Yellow 150
PR122 C.I. Pigment Red 122

Details of each mother nucleus pigment described in abbreviations in Table 1 are as follows.

<<Preparation of Ink>>

[Preparation of Ink 1]

<Preparation of Pigment Dispersion 1>

Nine parts of C.I. Pigment Blue 15:3 (hereinafter abbreviated to as PB 15:3), 1.0 part of Pigment derivative 1, 5 parts of pigment dispersant SOLSPERES 24000 (manufactured by ICI Japan), 10 parts of dimethyl sulfoxide (S-2) as Compound (A), and 60 parts of diethylene glycol diethyl ether and 15 parts of ethyleneglycol diacetate were mixed as Solvent (B) and dispersed by a horizontal type beads mill System Zeta mini, manufactured by Ashizawa Ltd., together with 60% by volume of zirconia beads having a diameter of 0.5 mm. Pigment Dispersion 1 was obtained after the zirconia beads were removed.

<Preparation of Resin Solution 1>

Ten parts of dimethyl sulfoxide as Compound (A), 65 parts of diethylene glycol diethyl ether and 15 parts of ethyleneglycol diacetate as Solvent (B) and 10 parts of vinyl chloride-vinyl acetate copolymer synthesized by solution polymerization method having a number average molecular weight of 22,000, VYHD manufactured by Dow Chemicals Co., Ltd, were mixed and dissolved. Thus, Resin Solution 1 was prepared.

<Preparation of Ink>

Fifty parts of Pigment Dispersion 1 was mixed with 50 parts of the above Resin Solution 1 while stirring and filtered through a filter of 0.8 μm. Thus Ink 1 was obtained.

[Preparation of Inks 2 to 38]

Inks 2 to 38 were prepared in the same manner as in Ink 1 except that the kind and the adding amount of pigment, the kind and the adding amount of pigment derivative, the kind and the adding amount of Compound (A), the kind and the adding amount of Solvent (B) and the kind and the adding amount of other solvent were changed as described in Tables 2 and 3.

Details of the additives described in abbreviations in Tables 2 and 3 are as follows. The numerical values of the content in Tables 1 and 2 are % by mass unless otherwise noted.

[Pigment]
PB15:3: C.I. Pigment Blue 15:3
PY150: C.I. Pigment Yellow 150
PR122: C.I. Pigment Red 122
CB: Carbon black

TABLE 2

| Ink No. | Pigment No. | Pigment Content | Pigment derivative No. | Pigment derivative Content | Compound (A) Kind | Compound (A) Content | Solvent (B) Solvent 1 Kind | Solvent (B) Solvent 1 Content | Solvent (B) Solvent 2 Kind | Solvent (B) Solvent 2 Content | Other solvent Solvent 1 Kind | Other solvent Solvent 1 Content | Other solvent Solvent 2 Kind | Other solvent Solvent 2 Content | Remarks |
|---|---|---|---|---|---|---|---|---|---|---|---|---|---|---|---|
| 1 | PB15:3 | 4.50 | 1 | 0.50 | S-2 | 10 | DEGDEE | 62.5 | EGDAc | 15 | — | — | — | — | Inventive |
| 2 | PB15:3 | 4.50 | 2 | 0.50 | S-2 | 10 | DEGDEE | 62.5 | EGDAc | 15 | — | — | — | — | Inventive |
| 3 | PB15:3 | 4.50 | 3 | 0.50 | S-2 | 10 | DEGDEE | 62.5 | EGDAc | 15 | — | — | — | — | Inventive |
| 4 | PB15:3 | 4.50 | 4 | 0.50 | S-2 | 10 | DEGDEE | 62.5 | EGDAc | 15 | — | — | — | — | Inventive |
| 5 | PB15:3 | 4.50 | 5 | 0.50 | S-2 | 10 | DEGDEE | 62.5 | EGDAc | 15 | — | — | — | — | Inventive |
| 6 | PB15:3 | 4.50 | 6 | 0.50 | S-2 | 10 | DEGDEE | 62.5 | EGDAc | 15 | — | — | — | — | Inventive |
| 7 | PB15:3 | 4.50 | 1 | 0.50 | S-1 | 10 | DEGDEE | 62.5 | EGDAc | 15 | — | — | — | — | Inventive |
| 8 | PB15:3 | 4.50 | 1 | 0.50 | S-3 | 10 | DEGDEE | 62.5 | EGDAc | 15 | — | — | — | — | Inventive |
| 9 | PB15:3 | 4.50 | 1 | 0.50 | S-4 | 10 | DEGDEE | 62.5 | EGDAc | 15 | — | — | — | — | Inventive |
| 10 | PB15:3 | 4.50 | 1 | 0.50 | S-5 | 10 | DEGDEE | 62.5 | EGDAc | 15 | — | — | — | — | Inventive |
| 11 | PB15:3 | 4.50 | 1 | 0.50 | S-6 | 10 | DEGDEE | 62.5 | EGDAc | 15 | — | — | — | — | Inventive |
| 12 | PB15:3 | 4.50 | 1 | 0.50 | S-7 | 10 | DEGDEE | 62.5 | EGDAc | 15 | — | — | — | — | Inventive |
| 13 | PB15:3 | 4.50 | 1 | 0.50 | S-8 | 10 | DEGDEE | 62.5 | EGDAc | 15 | — | — | — | — | Inventive |
| 14 | PB15:3 | 4.50 | 1 | 0.50 | S-9 | 10 | DEGDEE | 62.5 | EGDAc | 15 | — | — | — | — | Inventive |
| 15 | PB15:3 | 4.50 | 1 | 0.50 | S-10 | 10 | DEGDEE | 62.5 | EGDAc | 15 | — | — | — | — | Inventive |
| 16 | PB15:3 | 4.995 | 1 | 0.005 | S-7 | 10 | DEGDEE | 62.5 | EGDAc | 15 | — | — | — | — | Inventive |
| 17 | PB15:3 | 4.99 | 1 | 0.01 | S-7 | 10 | DEGDEE | 62.5 | EGDAc | 15 | — | — | — | — | Inventive |
| 18 | PB15:3 | 4.95 | 1 | 0.05 | S-7 | 10 | DEGDEE | 62.5 | EGDAc | 15 | — | — | — | — | Inventive |
| 19 | PB15:3 | 4.77 | 1 | 0.23 | S-7 | 10 | DEGDEE | 62.5 | EGDAc | 15 | — | — | — | — | Inventive |
| 20 | PB15:3 | 4.55 | 1 | 0.45 | S-7 | 10 | DEGDEE | 62.5 | EGDAc | 15 | — | — | — | — | Inventive |

Common additives
Dispersant: Solsperse 24000 (2.5% by mass)
Fixing resin: Vinyl chloride-Vinyl acetate copolymer (5% by mass)

TABLE 3

| Ink No. | Pigment No. | Pigment Content | Pigment derivative No. | Pigment derivative Content | Compound (A) Kind | Compound (A) Content | Solvent (B) Solvent 1 Kind | Solvent (B) Solvent 1 Content | Solvent (B) Solvent 2 Kind | Solvent (B) Solvent 2 Content | Other solvent Solvent 1 Kind | Other solvent Solvent 1 Content | Other solvent Solvent 2 Kind | Other solvent Solvent 2 Content | Remarks |
|---|---|---|---|---|---|---|---|---|---|---|---|---|---|---|---|
| 21 | PB15:3 | 4.30 | 1 | 0.70 | S-7 | 10 | DEGDEE | 62.5 | EGDAc | 15 | — | — | — | — | Inventive |
| 22 | PB15:3 | 4.10 | 1 | 0.90 | S-7 | 10 | DEGDEE | 62.5 | EGDAc | 15 | — | — | — | — | Inventive |
| 23 | PB15:3 | 4.50 | 1 | 0.50 | S-2 | 1.0 | DEGDEE | 71.5 | EGDAc | 15 | — | — | — | — | Inventive |
| 24 | PB15:3 | 4.50 | 1 | 0.50 | S-2 | 1.5 | DEGDEE | 71.0 | EGDAc | 15 | — | — | — | — | Inventive |
| 25 | PB15:3 | 4.50 | 1 | 0.50 | S-2 | 5.0 | DEGDEE | 67.5 | EGDAc | 15 | — | — | — | — | Inventive |
| 26 | PB15:3 | 4.50 | 1 | 0.50 | S-2 | 20 | DEGDEE | 52.5 | EGDAc | 15 | — | — | — | — | Inventive |
| 27 | PB15:3 | 4.50 | 1 | 0.50 | S-2 | 30 | DEGDEE | 42.5 | EGDAc | 15 | — | — | — | — | Inventive |
| 28 | PB15:3 | 4.50 | 1 | 0.50 | S-2 | 10 | DEGDME | 62.5 | EGDAc | 15 | — | — | — | — | Inventive |
| 29 | PB15:3 | 4.50 | 1 | 0.50 | S-2 | 10 | PGDAc | 62.5 | EGDAc | 15 | — | — | — | — | Inventive |
| 30 | PB15:3 | 4.50 | 1 | 0.50 | S-2 | 10 | DPGDAc | 62.5 | EGDAc | 15 | — | — | — | — | Inventive |
| 31 | PB15:3 | 4.50 | 1 | 0.50 | S-2 | 10 | DPGDME | 62.5 | EGDAc | 15 | — | — | — | — | Inventive |
| 32 | PY150 | 4.50 | 7 | 0.50 | S-2 | 10 | DEGDEE | 62.5 | EGDAc | 15 | — | — | — | — | Inventive |
| 33 | PR122 | 4.50 | 8 | 0.50 | S-2 | 10 | DEGDEE | 62.5 | EGDAc | 15 | — | — | — | — | Inventive |
| 34 | CB | 4.50 | 1 | 0.50 | S-2 | 10 | DEGDEE | 62.5 | EGDAc | 15 | — | — | — | — | Inventive |
| 35 | PB15:3 | 4.50 | 1 | 0.50 | — | — | DEGDEE | 67.5 | EGDAc | 20 | — | — | — | — | Comparative |
| 36 | PB15:3 | 5.00 | — | — | S-2 | 1 | DEGDEE | 66.5 | EGDAc | 20 | — | — | — | — | Comparative |
| 37 | PB15:3 | 5.00 | — | — | — | — | DEGDEE | 72.5 | — | — | NMP | 15 | — | — | Comparative |
| 38 | PB15:3 | 5.00 | — | — | — | — | — | — | — | — | NMP | 20 | EGBEAc | 67.5 | Comparative |

Common additives
Dispersant: Solsperse 24000 (2.5% by mass)
Fixing resin: Vinyl chloride-Vinyl acetate copolymer (5% by mass)

[Fixing Resin]

PVC: Solution polymerized vinyl chloride-vinyl acetate copolymer (Commercial name: VYHD, manufactured by Dow Chemicals Co., Ltd.)

[Compound (A)]
S-1: Di-n-propyl sulfoxide
S-2: Dimethyl sulfoxide
S-3: Di-n-butyl sulfoxide
S-4: Diphenyl sulfoxide
S-5: Tetramethylene sulfoxide
S-6: Dimethyl sulfone
S-7: Di-n-propyl sulfone
S-8: Methyl isopropyl sulfone
S-9: Methyl hydroxyethyl sulfone
5-10: Sulfolane

[Solvent (B)]
DEGDEE: Diethylene glycol diethyl ether
EGDAc: Ethylene glycol diacetate
DEGDME: Diethylene glycol dimethyl ether
PGDAc: Propylene glycol diacetate
DPGDEE: Dipropylene glycol diethyl ether
DPGDME: Dipropylene glycol dimethyl ether

[Other Solvent]
EGBEAc: Ethylene glycol monobutyl ether acetate
NMP: N-methylpyrrolidone <<Evaluation of Ink>>

Each of the above prepared inks was evaluated for odor according to the following methods.

[Evaluation of Odor]

A 500 ml polyethylene bottle was filled half-full with each of the inks 1 to 38 and the odor of each of the samples was classified into five ranks by 10 testing persons. The sample judged as almost non-odor was given 1 point and that judged as very unpleasant order was given 5 points, and the order of the sample was evaluated according to the following norms.

A: The average point given by the 10 testers was not less than 4.0.

B: The average point given by the 10 testers was not less than 3.0 and less than 4.0.

C: The average point given by the 10 testers was not less than 2.0 and less than 3.0.

D: The average point given by the 10 testers was less than 2.0.

<<Evaluation of Formed Image>>

[Formation of Image]

Each of the inks was charged into an on-demand type ink-jet printer having the maximum recording density of 1440×1440 dpi in which a piezo type head having a nozzle diameter of 28 μm a driving frequency of 15 kHz, a nozzle number of 512, a minimum droplet volume of 14 pl and a nozzle density of 180 dpi and a heater were installed. The ink was ejected onto a polyvinyl chloride recording medium JT5929PM, manufactured by Mactac Co., Ltd., to record a solid image of 10 cm×10 cm. The temperature of the heater was set so that the surface temperature of the recording medium was held at 45° C. by heating from the backside of the recording medium during the printing. The surface temperature of the recording medium was measured by a non-contacting thermometer IT-530N manufactured by Horiba Seisakusho.

[Evaluation of Image]

The images formed by Inks 1-38 were each evaluated according to the following method. In each of the evaluation items, Rank C or higher was judged as acceptable level.

<Evaluation of Abrasion Resistance 1>

The abrasion resistance of the image formed on a polyvinyl chloride was evaluated according the following norms by rubbing the image surface by dry cotton.

A: The image was almost not varied even when the surface was rubbed for 61 or more times.

B: The image density was almost not influenced though damages were slightly formed on the surface of the image after rubbing for 60 times.

C: The image density was lowered during the rubbing for 30 to 59 times.

D: The image density was lowered during the rubbing for less than 30 times.

<Evaluation of Resistivity to Wiping with Alcohol>

The image formed on the polyvinyl chloride was rubbed by cotton cloth impregnated with mixed solution of ethanol and water by 2:1 and resistivity to wiping with alcohol was evaluated according to the following norms.

A: The image is almost not varied even when the image was rubbed for 41 or more times.

B: The image density was almost not influenced though damages were slightly formed on the surface of the image after rubbing for 40 times.

C: The image density was lowered between 20 times to 39 times of the rubbing.

D: The image density was lowered by rubbing for less than 20 times.

Results obtained by the above tests were listed in Table 4.

TABLE 4

| Ink No. | Evaluation Result | | | Remarks |
| | Odor | Abrasion resistance 1 | Resistivity to wiping with alcohol | |
| --- | --- | --- | --- | --- |
| 1 | B | B | B | Inventive |
| 2 | B | B | B | Inventive |
| 3 | B | B | B | Inventive |
| 4 | B | A | B | Inventive |
| 5 | B | A | A | Inventive |
| 6 | B | A | A | Inventive |
| 7 | B | A | A | Inventive |
| 8 | B | B | B | Inventive |
| 9 | B | B | B | Inventive |
| 10 | B | B | B | Inventive |
| 11 | B | B | B | Inventive |
| 12 | B | B | B | Inventive |
| 13 | B | B | B | Inventive |
| 14 | B | B | B | Inventive |
| 15 | B | A | A | Inventive |
| 16 | B | C | C | Inventive |
| 17 | B | B | B | Inventive |
| 18 | B | A | A | Inventive |
| 19 | B | A | A | Inventive |
| 20 | B | A | A | Inventive |
| 21 | B | B | B | Inventive |
| 22 | B | C | C | Inventive |
| 23 | A | C | C | Inventive |
| 24 | A | B | B | Inventive |
| 25 | A | A | A | Inventive |
| 26 | B | A | A | Inventive |
| 27 | B | A | A | Inventive |
| 28 | B | B | B | Inventive |
| 29 | B | B | B | Inventive |
| 30 | B | B | B | Inventive |
| 31 | B | B | B | Inventive |
| 32 | B | B | B | Inventive |
| 33 | B | B | B | Inventive |
| 34 | B | B | B | Inventive |
| 35 | A | D | D | Comparative |
| 36 | A | D | D | Comparative |
| 37 | D | D | D | Comparative |
| 38 | D | D | D | Comparative |

As is cleared by the results listed in Table 4, the inks constituted according to the invention is superior to the comparative inks in all performances of the odor of the ink, abrasion resistance and resistivity to wiping with alcohol of the image formed on the polyvinyl chloride recording medium.

Example 2

Preparation of Inks

[Preparation of Inks 39 to 60]
Inks 39 to 60 were prepared in the same manner as in Ink 1 described in Example 1 except that the kind of pigment, the kind and the adding amount of pigment derivative, the kind and the adding amount of fixing resin, the kind and the adding amount of Compound (A), the kind and the adding amount of Solvent (B) and the kind and the adding amount of other solvent were changed as described in Table 5.

<<Evaluation of Ink>>

Each of the above prepared inks was evaluated for ejection stability according to the following methods and for odor according to the same manner as Example 1.

[Evaluation of Ejection Suitability]

Flying situation of ink droplets was monitored by a CCD camera under a condition in which the ejection cycle of the ink droplet and that of lighting was synchronized by using a piezo type head having a nozzle diameter of 28 μm, a driving frequency of 15 kHz, a nozzle number of 512, a minimum droplet volume of 14 pl, a nozzle density of 180 dpi (dpi is dot number per 2.54 cm) and a strobe type ink flight observing apparatus described in FIG. 2 JP-A 2002-363469. The ejecting situation in an environment of 23° C., 55% R.H was evaluated according to the following norms.

A: The ink droplets were normally ejected and any irregularity such as irregularity in the flying direction, lacking of

TABLE 5

| Ink No. | Pigment No. | Pigment Content | derivative No. | derivative Content | Fixing resin Kind | Fixing resin Content | Compound (A) Kind | Compound (A) Content | Solvent (B) Solvent 1 Kind | Solvent 1 Content | Solvent 2 Kind | Solvent 2 Content | Other solvent Kind | Other solvent Content |
|---|---|---|---|---|---|---|---|---|---|---|---|---|---|---|
| 39 | PB15:3 | 4.50 | 5 | 0.50 | mPVC | 7.0 | S-10 | 5 | DEGDEE | 65.5 | EGDAc | 15 | — | — |
| 40 | PB15:3 | 4.50 | 5 | 0.50 | mPVC | 7.0 | S-10 | 3 | DEGDEE | 62.5 | EGDAc | 20 | — | — |
| 41 | PB15:3 | 4.50 | 5 | 0.50 | mPVC | 7.0 | S-10 | 10 | DEGDEE | 55.5 | EGDAc | 20 | — | — |
| 42 | PB15:3 | 4.50 | 5 | 0.50 | mPVC | 7.0 | S-10 | 30 | DEGDEE | 55.5 | — | — | — | — |
| 43 | PB15:3 | 4.50 | 5 | 0.50 | mPVC | 7.0 | S-10 | 10 | DEGDME | 60.5 | EGDAc | 15 | — | — |
| 44 | PB15:3 | 4.50 | 5 | 0.50 | mPVC | 7.0 | S-10 | 10 | DEGDEE | 50.5 | PGDAc | 15 | DPGMEAc | 10 |
| 45 | PB15:3 | 4.50 | 5 | 0.50 | mPVC | 7.0 | S-10 | 5 | EGDAc | 80.5 | — | — | — | — |
| 46 | PB15:3 | 4.50 | 5 | 0.50 | mPVC | 7.0 | S-10 | 5 | DPGDEE | 65.5 | — | — | TEGDME | 15 |
| 47 | PB15:3 | 4.50 | 5 | 0.50 | mPVC | 7.0 | S-10 | 5 | DEGDEE | 70.5 | — | — | DEGDBE | 10 |
| 48 | PB15:3 | 4.50 | 5 | 0.50 | mPVC | 7.0 | S-10 | 5 | DPGDME | 70.5 | EGDAc | 10 | — | — |
| 49 | PB15:3 | 4.50 | 5 | 0.50 | mPVC | 7.0 | S-10 | 5 | PGDAc | 57.5 | EGDAc | 20 | — | — |
| 50 | PB15:3 | 4.50 | 5 | 0.50 | mPVC | 5.0 | S-10 | 5 | DEGDEE | 67.5 | EGDAc | 15 | — | — |
| 51 | PB15:3 | 4.50 | 5 | 0.50 | mPVC | 7.0 | S-10 | 5 | DEGDEE | 65.5 | EGDAc | 15 | — | — |
| 52 | PB15:3 | 4.50 | 5 | 0.50 | mPVC | 5.0 | S-10 | 5 | DEGDEE | 67.5 | EGDAc | 15 | — | — |
| 53 | PY150 | 4.50 | 9 | 0.50 | mPVC | 7.0 | S-10 | 5 | DEGDEE | 65.5 | EGDAc | 15 | — | — |
| 54 | PR122 | 4.50 | 10 | 0.50 | mPVC | 7.0 | S-10 | 5 | DEGDEE | 65.5 | EGDAc | 15 | — | — |
| 55 | PB15:3 | 4.50 | 5 | 0.50 | sPVC | 7.0 | S-10 | 5 | DEGDEE | 65.5 | EGDAc | 15 | — | — |
| 56 | PB15:3 | 4.50 | 5 | 0.50 | sPVC | 5.0 | S-10 | 5 | DEGDEE | 65.5 | EGDAc | 15 | — | — |
| 57 | PB15:3 | 4.50 | 5 | 0.50 | mPVC | 7.0 | S-1 | 5 | DEGDEE | 65.5 | EGDAc | 15 | — | — |
| 58 | PB15:3 | 4.50 | 5 | 0.50 | mPVC | 5.0 | S-1 | 5 | DEGDEE | 65.5 | EGDAc | 15 | — | — |
| 59 | PB15:3 | 4.50 | 5 | 0.50 | sPVC | 7.0 | S-1 | 5 | DEGDEE | 65.5 | EGDAc | 15 | — | — |
| 60 | PB15:3 | 4.50 | 5 | 0.50 | sPVC | 5.0 | S-1 | 5 | DEGDEE | 67.5 | EGDAc | 15 | — | — |

Common additives
Dispersant: Solsperse 24000 (2.5% by mass)

Details of the additives described in abbreviations in Table 5 are as follows. The numerical values of the content in Table 5 are % by mass unless otherwise noted.

[Fixing Resin]
mPVC: Solution polymerized vinyl chloride-vinyl acetate-maleic anhydride copolymer (Commercial name: VMCC, manufactured by Dow Chemicals Co., Ltd.)
sPVC: Suspension polymerized vinyl chloride-vinyl acetate copolymer (Commercial name: SOLBIN TAO, manufactured by Nishin Chemical Industry Co., Ltd)
[Other Solvent]
TEGDME: Tetraethylene glycol dibutyl ether
DPGDMEAc: Dipropylene glycol monomethyl ether acetate
DEGDBE: Diethylene glycol dibutyl ether Details of additives other than fixing resin and other solvent above described in abbreviations in Table 5 are as same as Example 1.

ejection and fluctuation in flying speed was not observed even when the ejection was restarted after an interruption for 3 minutes.

B: The ink droplets were normally ejected and any irregularity was not observed even when the ejection was restarted after an interruption for 1 minute. However, irregular direction and speed fluctuation of the ink droplets were observed at some nozzles when the ejection was restarted after interruption for 3 minutes.

C: The ink droplets were normally ejected but irregular direction and speed fluctuation of the ink droplets were observed at some nozzles when the ejection was restarted after an interruption for 1 minute.

D: Normal ejection of ink droplets was difficultly performed and irregular direction of the droplets was caused at some nozzles and irregularity in the direction and fluctuation in the flying speed and lacking of ejection was caused at many nozzles when the ejection was restarted after an interruption for 1 minute.

<Evaluation of Formed Image>

Image was formed by using Inks 39-60 under the same manner as described in Example 1. Abrasion resistance 2 was evaluated by the method described bellow and the resistivity to wiping with alcohol was evaluated by the same method as described in Example 1. Rank C or higher was judged as acceptable level.

<Evaluation of Abrasion Resistance 2>

The abrasion resistance of the image formed on a polyvinyl chloride was evaluated according the following norms by rubbing the image surface by dry cotton. Evaluation of abrasion resistance 2 was more severe evaluation than Evaluation of abrasion resistance 1 in Example 1 due to increasing the numbers of abrasion.

A: The image was almost not varied even when the surface was rubbed for 101 or more times.

B: The image density was almost not influenced though damages were slightly formed on the surface of the image after rubbing for 100 times.

C: The image density was lowered during the rubbing for 50 to 99 times.

D: The image density was lowered during the rubbing for 50 times.

Results obtained by the above tests were listed in Table 6.

TABLE 6

| | Evaluation Result | | | |
|---|---|---|---|---|
| Ink No. | Odor | Ejection suitability | Abrasion resistance 2 | Resistivity to wiping with alcohol |
| 39 | A | A | A | A |
| 40 | A | A | C | B |
| 41 | A | A | A | A |
| 42 | B | A | A | A |
| 43 | A | A | A | B |
| 44 | B | A | A | B |
| 45 | B | A | A | B |
| 46 | A | A | A | A |
| 47 | A | A | A | A |
| 48 | A | A | B | B |
| 49 | B | A | A | A |
| 50 | A | A | B | B |
| 51 | A | A | A | A |
| 52 | A | A | B | B |
| 53 | A | A | A | A |
| 54 | A | A | A | A |
| 55 | A | C | A | A |
| 56 | A | B | C | B |
| 57 | A | A | A | A |
| 58 | A | A | C | B |
| 59 | A | C | A | A |
| 60 | A | B | C | B |

As is cleared by the results listed in Table 6, it is found that the inks comprising the constitution of the present invention is superior in performances of the odor of the ink, abrasion resistance and resistivity to wiping with alcohol of the image formed on the polyvinyl chloride recording medium. Further, it is found that by using the resin synthesized by solution polymerization method, more resin can be contained in ink without effecting on ink ejection, resulting in improving more abrasion resistance.

Example 3

Images were formed by using Inks 1, 35-38 prepared in Example 1 on each recording medium described in Table 7 in place of polyvinyl chloride as the recording medium. Abrasion resistance and resistivity to wiping with alcohol were evaluated in the same manner as described in Example 1. Results were shown in Table 7.

Details of the recording medium described in abbreviations in Table 7 are as follows.

PET: Polyethylene terephthalate sheet
PP: Polypropylene sheet
ABS: Acrylonitril-butadiene-styrene copolymer sheet
PC: Polycarbonate sheet
POM: Polyoxymethylene resin sheet
PA: polyacrylate
PI: Polyimide
PVC: Poly vinyl chloride
PE: Polyethylene

TABLE 7

| | | Evaluation Result | | |
|---|---|---|---|---|
| Ink No. | Recording medium Kind | Abrasion resistance 1 | Resistivity to wiping with alcohol | Remarks |
| 1 | White PET | B | B | Inventive |
| 35 | White PET | D | D | Comparative |
| 36 | White PET | D | D | Comparative |
| 37 | White PET | D | D | Comparative |
| 38 | White PET | D | D | Comparative |
| 1 | White PP | B | B | Inventive |
| 35 | White PP | D | D | Comparative |
| 36 | White PP | D | D | Comparative |
| 37 | White PP | D | D | Comparative |
| 38 | White PP | D | D | Comparative |
| 1 | Slight brown ABS | B | B | Inventive |
| 35 | Slight brown ABS | D | D | Comparative |
| 36 | Slight brown ABS | D | D | Comparative |
| 37 | Slight brown ABS | D | D | Comparative |
| 38 | Slight brown ABS | D | D | Comparative |
| 1 | Aluminum plate | B | B | Inventive |
| 35 | Aluminum plate | D | D | Comparative |
| 36 | Aluminum plate | D | D | Comparative |
| 37 | Aluminum plate | D | D | Comparative |
| 38 | Aluminum plate | D | D | Comparative |
| 1 | Transparent PC | B | B | Inventive |
| 1 | White POM | B | B | Inventive |
| 1 | White PA | B | B | Inventive |
| 1 | Slight yellow PI | B | B | Inventive |
| 1 | Transparent Hard PVC | B | B | Inventive |
| 1 | Transparent Acryl | B | B | Inventive |
| 1 | White PE | B | B | Inventive |
| 1 | Glass plate | B | B | Inventive |
| 1 | White ceramic plate | B | B | Inventive |

As is cleared by the results listed in Table 7, the inks constituted according to the invention exhibit excellent abrasion resistance and resistivity to wiping with alcohol, even when the image was recorded on the recording medium having constitution element of a polyvinyl chloride, a resin substrate without a plasticizer and a non-absorbable inorganic substrate.

What is claimed is:

1. A non-aqueous ink-jet ink comprising a pigment, a pigment derivative having an acid group, a resin for fixing an image, a compound (A) which is at least one selected from the group of dimethyl sulfoxide, diethyl sulfoxide, methyl ethyl sulfoxide, diphenyl sulfoxide, tetraethylene sulfoxide, dimethylsulfone, methyl ethyl sulfone, methyl isopropyl sulfone, methylhydroxyethyl sulfone and sulfolane, and a Solvent (B) which is at least one selected from the group of diethyleneglycol diethyl ether, dioropyleneglycol dimethyl ether, dipropyleneglycol diethyl ether, ethyleneglycol diacetate and propylene glycol diacetate, wherein the resin for fixing an image is produced by a solution polymerization method.

2. The non-aqueous ink-jet ink of claim 1, wherein a content of the compound (A) is 1.5% to 30% by mass.

3. The non-aqueous ink jet ink of claim 1, wherein a content of the Solvent (B) is 50% to 90% by mass.

4. The non-aqueous ink-jet ink of claim 1,
wherein the resin for fixing an image has a number average molecular weight of from 10,000 to 30,000; and
the resin is at least one selected from the group of a vinyl chloride-vinyl acetate copolymer, a vinyl chloride-vinyl acetate-maleic anhydride copolymer, a vinyl, chloride-vinyl acetate vinyl alcohol copolymer and a vinyl chloride-vinyl, acetate-hydroxyalkyl acrylate copolymer.

5. An inkjet recording method of forming an image on a recording medium by using the non-aqueous ink-jet ink of claim 1, wherein the recording medium comprising at least one selected from the group of a polyvinyl chloride or a resin substrate without a plasticizer and an non-absorbable inorganic substrate as a constituting element.

* * * * *